(12) United States Patent
Gallagher et al.

(10) Patent No.: US 7,893,963 B2
(45) Date of Patent: Feb. 22, 2011

(54) DIGITAL CAMERA WHICH ESTIMATES AND CORRECTS SMALL CAMERA ROTATIONS

(75) Inventors: Andrew C. Gallagher, Brockport, NY (US); Kenneth A. Parulski, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 1312 days.

(21) Appl. No.: 11/134,593

(22) Filed: May 19, 2005

(65) Prior Publication Data

US 2005/0212931 A1 Sep. 29, 2005

Related U.S. Application Data

(63) Continuation-in-part of application No. 09/663,056, filed on Sep. 15, 2000, now Pat. No. 6,968,094.

(60) Provisional application No. 60/192,400, filed on Mar. 27, 2000.

(51) Int. Cl.
*H04N 5/228* (2006.01)
*H04N 5/76* (2006.01)
*H04N 5/222* (2006.01)
*G06K 9/32* (2006.01)

(52) U.S. Cl. ............... 348/208.6; 348/333.12; 348/231.3; 382/296; 382/297

(58) Field of Classification Search ............ 348/333.12, 348/222.1, 231.3, 208.99, 208.6; 382/296, 382/297
See application file for complete search history.

(56) References Cited

U.S. PATENT DOCUMENTS 3,069,654 A 12/1962 Hough ................. 340/146.3

(Continued)

FOREIGN PATENT DOCUMENTS

JP 09-135331 * 5/1997

OTHER PUBLICATIONS

U.S. Appl. No. 09/549,356, filed Apr. 14, 2000, Girish V. Prabhu et al.

(Continued)

*Primary Examiner*—Nhan T Tran
(74) *Attorney, Agent, or Firm*—Stephen H. Shaw; Kevin E. Spaulding

(57) ABSTRACT

A method of detecting and correcting camera rotation in a digital camera, that includes the steps of: capturing a digital image to provide a captured digital image; and analyzing the captured digital image to detect a set of lines. The set of lines are used to determine a rotation angle of the captured digital image; and the captured digital image is modified based on the rotation angle, before storing the modified digital image.

20 Claims, 10 Drawing Sheets

U.S. PATENT DOCUMENTS

| | | | |
|---|---|---|---|
| 5,164,831 A | 11/1992 | Kuchta et al. | 358/209 |
| 5,220,508 A * | 6/1993 | Ninomiya et al. | 348/119 |
| 5,227,889 A * | 7/1993 | Yoneyama et al. | 348/208.6 |
| 5,528,194 A | 6/1996 | Ohtani et al. | 382/293 |
| 5,651,075 A | 7/1997 | Frazier et al. | 382/105 |
| 5,825,947 A * | 10/1998 | Sasaki et al. | 382/321 |
| 5,900,909 A | 5/1999 | Parulski et al. | 348/232 |
| 6,011,585 A * | 1/2000 | Anderson | 348/222.1 |
| 6,226,004 B1 * | 5/2001 | Nishihara | 345/420 |
| 6,400,848 B1 | 6/2002 | Gallagher | 382/254 |
| 6,600,511 B1 * | 7/2003 | Kaneko et al. | 348/231.3 |
| 6,778,699 B1 | 8/2004 | Gallagher | 382/165 |
| 6,968,094 B1 * | 11/2005 | Gallagher | 382/296 |
| 7,079,707 B2 | 7/2006 | Baron | |

OTHER PUBLICATIONS

"Contribution to the Determination of Vanishing Points Using Hough Transform" by Lutton et al. IEEE Trans. Pattern Analysis and Machine Intelligence, vol. 16, No. 4, pp. 430-438, Apr. 1994.

"Interpreting Perspective Images" by S. Barnard. Artificial Intelligence, vol. 21, pp. 435-462, 1983.

* cited by examiner

DIGITAL CAMERA WHICH ESTIMATES AND CORRECTS SMALL CAMERA ROTATIONS

CROSS REFERENCE TO RELATED APPLICATIONS

This patent is a continuation-in-part of U. S. patent application Ser. No. 09/663,056, filed Sep. 15, 2000, now U.S. Pat. No. 6,968,094 issued Nov. 22, 2005 and entitled "A Method of Estimating and Correcting Rotation with Vanishing Point Location" by Andrew C. Gallagher, which claims priority from Ser. No. 60/192,400, filed on March 27, 2000 and entitled "Correction of Small Image Rotations Based on Vanishing point Detection".

FIELD OF THE INVENTION

The invention relates generally to the field of image processing. More specifically, the invention relates to estimating and correcting for unintentional rotational camera angles that occur at the time of image capture. Furthermore, the invention relates to performing such image processing in a digital camera.

BACKGROUND OF THE INVENTION

Conventional consumer cameras (both film and digital) capture an image having a rectangular imaging area. For cameras using 35 mm film, the horizontal dimension of the imaging area is approximately 36 mm and the vertical dimension of the imaging area is approximately 24 mm.

Many photographers find it very difficult to hold a camera level when capturing a photograph. A photographer often pivots the camera slightly about the optical axis (whereby the optical axis is defined as an axis passing through the center of the image capture frame and the center of the camera lens). These small rotations are generally unintentional and may occur because conventional consumer cameras are lightweight, for example, the popular One Time Use Cameras (OTUCs). Rotations about the optical axis give the appearance that the subjects in the photograph are off-centered, leaning, or tilted.

U.S. Pat. No. 6,011,585 issued Jan. 4, 2000 to Anderson, entitled "Apparatus and Method for Rotating the Display Orientation of a Captured Image" describes a method of determining image format and image orientation from a sensor present in the camera at the time of image capture. Whereas, this sensor can enable one to determine the orientation or format of a captured image, it cannot lead to detecting a small amount of camera rotation. Instead, the sensor identifies the major image orientation (in increments of 90 degrees) by determining which side of an image corresponds with the "top" of the image.

In U.S. Pat. No. 5,227,889, Yoneyama et al describe a video camera having a separate sensor for detecting slant of the camera. The image is then rotated to remove the effect of the slant from the image.

In U.S. Pat. No. 5,528,194, Ohtani et al describe a camera and processing to apply a geometric transform to an image captured with the camera. The geometric transform is derived based on a measured azimuth angle between the camera and the subject. According to col. 4. lines 10-14, the sensor measuring the azimuth needs to record the relative angle to the subject being photographed. The sensor can be a GPS (global positioning satellite) or a geomagnetic sensor that determines a three-dimensional position of both the camera and subject to determine the azimuth angle.

Lutton et al. (in "Contribution to the Determination of Vanishing Points Using Hough Transform," *IEEE Trans. Pattern Analysis and Machine Intelligence*, Vol. 16, No. 4, pp. 430-438, April 1994) attempts to detect the vertical direction of an image. The Lutton et al. article teaches one to select the direction that is orthogonal to the most directions in the scene. The implicit assumption is that the scene will contain many horizontal lines. However, this is not always the case. The Lutton method requires a great deal of processing and may be computationally costly.

Some existing systems detect and correct a skewed image. These systems are primarily in the field of document imaging. Nevertheless, documents have a fairly well defined structure, as opposed to more unpredictable consumer type photographs.

U.S. Pat. No. 5,651,075 by Frazier et al., describes a method of compensating for the perspective distortion present in an image of a license plate captured at a known camera to subject distance. This patent describes a method of modifying the perspective by using the known relationship between the camera and the subject, which relationship is always constant. This arrangement would not be practical for general use at reducing perspective distortion.

U.S. Pat. No. 6,400,848 by Gallagher, entitled "A Method for Modifying the Perspective of a Digital Image", shows a process for compensating from the perspective of image capture. However, this solution cannot lead to compensating for camera rotation about the optical axis. The perspective of image capture relates to tipping the camera in the up and down direction (i.e. about the x-axis), which is much different than rotating a camera about the optical axis. Therefore, U.S. Pat. No. 6,400,848 is limited to describing a method of correction exclusively unique to the problem of camera rotation about the x-axis.

Consequently, a need exists for overcoming the above described drawbacks. More specifically, a need exists for determining slight image orientation changes as an image is captured in a digital camera, so that images stored by the digital camera are corrected for slight changes in image orientation.

SUMMARY OF THE INVENTION

The need is met according to the present invention by providing a method of detecting and correcting camera rotation in a digital camera, that includes the steps of: capturing a digital image to provide a captured digital image, and analyzing the captured digital image to detect a set of lines. The set of lines are used to determine a rotation angle of the captured digital image, and the captured digital image is modified based on the rotation angle before storing the modified digital image.

A second embodiment of the present invention uses a gravitational orientation sensor for determining vertical axis of the captured digital image and modifies the captured digital image based on the rotation angle and the vertical axis.

A third embodiment of the present invention employs a user interface to enable a user to select either the captured digital image or the modified digital image for storage.

An alternative aspect of the present invention provides a digital camera that includes:
 a) an image sensor for capturing an image;
 b) a first memory for storing the captured image;
 c) a processor for analyzing the captured image to determine a rotation angle of the captured image and for providing a modified image based on the rotation angle;
 d) a display for displaying the modified image;

e) a user interface for selecting the modified image or the captured image; and f) a second memory for storing the selected image.

The present invention has an advantage of improving the method of correcting for small angles of camera rotation, i.e. camera tilt within a digital camera as the image is being captured.

BRIEF DESCRIPTION OF THE DRAWINGS

The subject matter of the invention is described with reference to the embodiments shown in the drawings.

DETAILED DESCRIPTION OF THE INVENTION

In the following description, the present invention will be described in the preferred embodiment as a method. Those skilled in the art will readily recognize that the equivalent of such a method may also be constructed as hardware or software within the scope of the invention.

Figure 1:
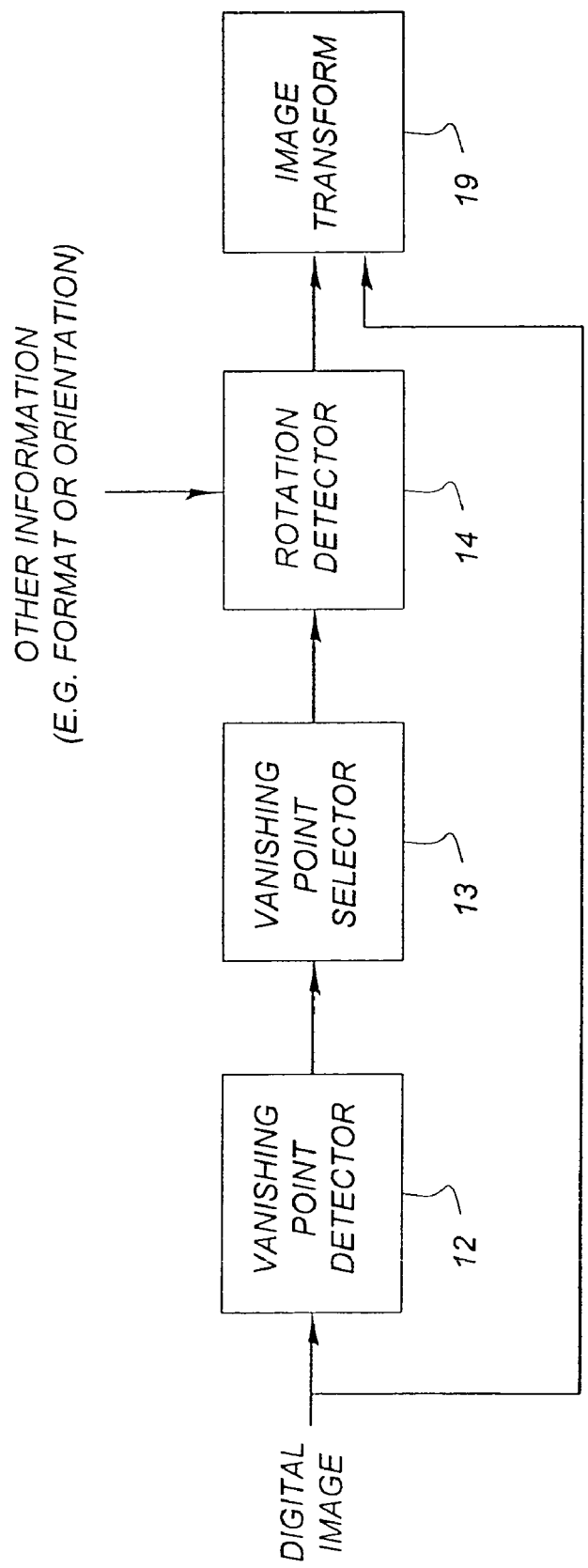
FIG. 1 is a schematic representation of the system providing a method of determining the amount of rotation present in an image and a means for correcting the rotation.

FIG. 1 shows a block diagram of the present invention that corrects images for unintentional small rotations of the camera that may range anywhere from 1 degree to 45 degrees. The present invention estimates the amounts of rotation of a camera relative to the scene at the time of image capture, based upon a digitized representation of an image. The source of the digitized image is irrelevant. The digitized image may be a scan of a film negative, a scan of a photograph, or an image captured with a digital camera. It should be well understood that in cases where the digitized image is a scan of a hardcopy image that the rotation of the digitized image corresponds to the rotation of the source image. That is, if a photograph was captured with a camera that was tilted by $\beta$ degrees, then the corresponding scan of that photograph (or the scan of the photographic negative) will also be tilted by $\beta$ degrees. Thus, the method described herein may be used to automatically determine the amount of camera rotation at the time of capturing the photograph, for example; by first digitizing the photograph and then analyzing the resulting scan with the method of the preferred embodiment. In this case, the source image is the photograph and the digital image is a result of the scan. It should be further understood that the source image may, for example, be a large resolution digital image. This source image may then be decimated to generate the digital image that the method of the present embodiment operates upon. Again, the result from the present invention applies to both a source image and a digital image. Note that the preferred embodiment is described with reference to digital images having a dimension of 512 pixels by 768 pixels, although those skilled in the art will recognize that many image resolutions may be utilized with equal success. For example, the present invention is also suitable for processing a digital image having dimensions of 512 pixels by 512 pixels. Note also that the terms "digitized image", "digital image", and "image" are used synonymously throughout this description.

Vanishing points are a useful feature for determining the amount of rotation of an image because of the many vertical parallel lines associated with human construction. Despite a left to right positioning of the camera (or other image capture device), the vanishing point associated with the vertical scene lines nearly always falls near the vertical axis of the image.

Figure 2:
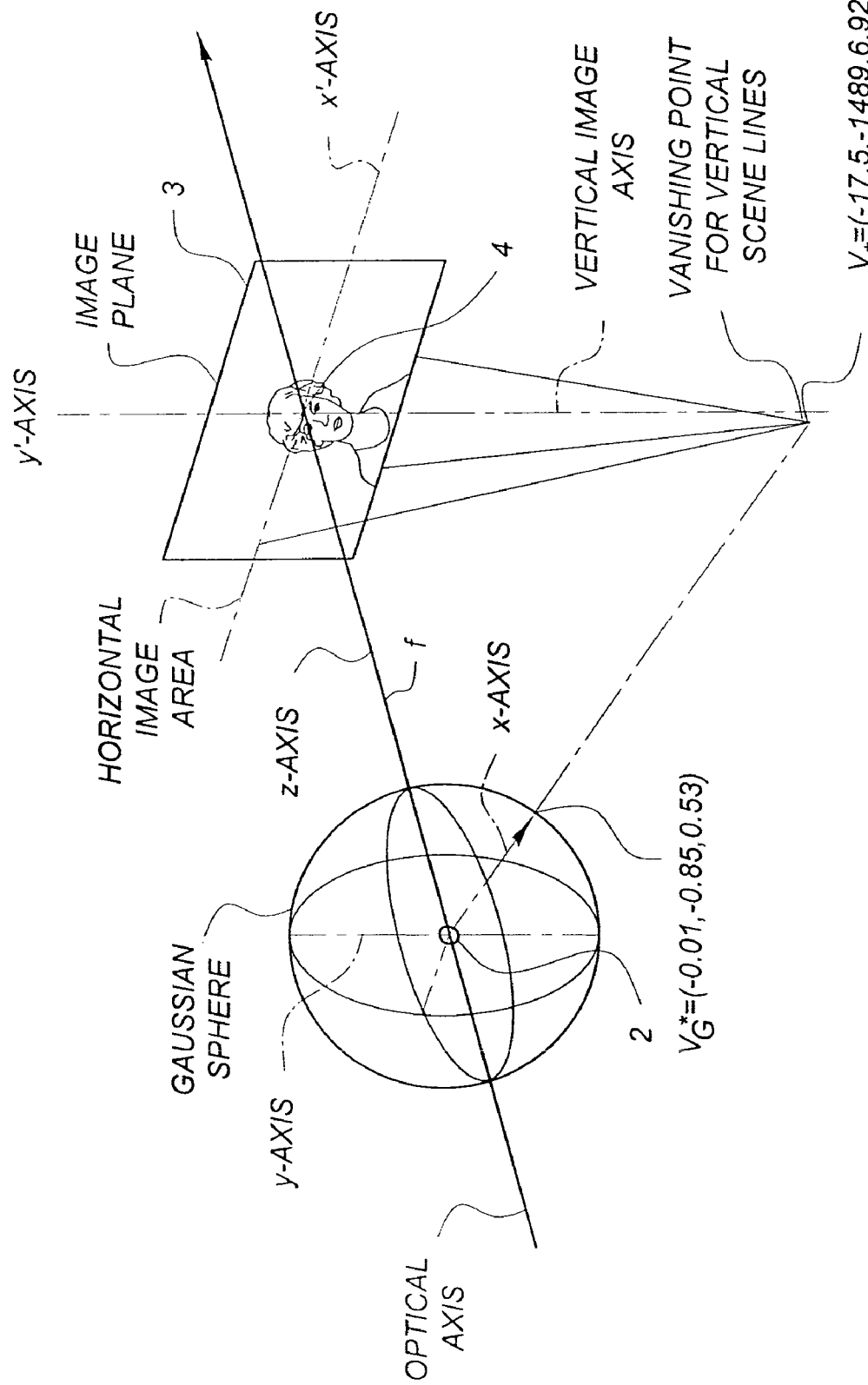
FIG. 2 is a schematic of the reference systems employed to describe the present invention.

FIG. 2 shows a reference system employed with the present invention. A focal point 2, representing the approximate location of the focal point of the lens used to capture the image, is located a distance d from the image plane 3. The focal point 2 represents the center of a Gaussian sphere. The x-axis and y-axis define the dimensionality of the image plane 3. The z'-axis is also defined as the "optical axis" of the system. The x'-axis and the y'-axis define a plane that is parallel to the image plane 3. The image origin 4 is defined as the point of intersection of the image plane with the optical axis, and is given in Cartesian coordinates as (0,0,f). Generally, the image origin is assumed to be at the center of the distribution of pixels comprising the digital image, although this assumption may not be correct. In fact, if the camera is constrained to only pivot up or down (pivoting solely about the x-axis), the vanishing point associated with vertical scene lines must fall on the vertical axis of the image. For many photographers, a pleasing captured image results by maintaining a level camera during shooting the image. Attempting to keep the camera level applies whether the camera is held by hand or placed on a tripod or some other mechanical device. Because it is desirable to capture an image with a camera held level (i.e., pivoting solely about the x-axis), and such practice results in the vanishing point most closely associated with the image's vertical scene lines to fall on the vertical axis of the image, consequently, the vertical axis of the image is defined as a preferable vanishing point location for achieving a user desired image composition. In other words, the captured image is preferably represented as a level depiction of the captured scene with respect to the vertical lines within the scene. However, if the camera is rotated about the optical axis (the z-axis), then the vanishing point associated with vertical scene lines will not fall on the vertical axis of the image. Nevertheless, the angle from the vanishing point corresponding to the vertical scene lines to the vertical axis of the image is equivalent to the amount that the camera was rotated about the optical axis.

In a human-made construction, there are also a large number of horizontal lines (lines orthogonal to the vertical lines). If these horizontal lines happen to be parallel to the image plane (i.e., orthogonal to the optical axis), then a vanishing point for the horizontal lines will occur at infinity on the horizontal axis of the image. However, depending upon the position of the photographer, it is very likely that the horizontal scene lines will not be parallel to the image plane. If this condition exists and the camera is tilted about the x-axis, then the vanishing point associated with the horizontal scene lines will not fall on either axis of the image plane. Thus, the vanishing point associated with horizontal lines in the scene may fall on the horizontal axis of the image, but because of the scene composition it is just as likely that the vanishing point will fall elsewhere. Hence, the vanishing point location corresponding to the horizontal lines in the scene is not constrained to fall near an image axis, but it is highly likely that the vanishing point location associated with the vertical lines of the scene will fall near the vertical axis of the image. Conversely, if a vanishing point is located near an image axis, it is far more likely that this vanishing point corresponds to a set of vertical scene lines than a set of horizontal scene lines.

FIG. 2 discloses an example of expressing a vanishing point location. First, a vanishing point may be expressed as a location on the image plane. The vanishing point v may be expressed as the point at location $v=(x_o, y_o, f)$. Such a representation of the vanishing point location performs well when the vanishing point is located near the image origin, however, the coordinate locations along the x-axis and the y-axis may grow quite large. Another aspect of the invention illustrated in FIG. 2 is a vanishing point representation scheme, commonly used in the field of vanishing point detection. In this representation, the vanishing point is represented with a Gaussian mapping. As such, each location v on the image plane has a unique location $v_G$ on the Gaussian sphere. The relationship between the vanishing point location on the image plane $v=(x_o, y_o, f)$ and the vanishing point vector $v_G$ determined by the Gaussian mapping is given with the equation:

$$v_G = \frac{v}{|v|}$$

Likewise, if the vanishing point vector $v_G=(x_G, y_G, z_G)$ is known and the vanishing point location in the image plane is desired, then the following projection is used:

$$v = \frac{fv_G}{z}$$

One can easily see that the vanishing point vector $v_G$ is a unit vector extending in the direction from the focal point to the vanishing point location in the image plane. With reference to FIG. 2, the image plane is positioned f distance from the optical origin of the system. Normally f distance represents the focal length. If the focal length is unknown, then a reasonable guess may be used. In one embodiment, f is the diagonal length of the imager. For example, where an image has a dimension of 512 pixels by 768 pixels, f equals 923. The vanishing point on the image plane may then be represented as the unit vector that points from the optical system's origin to the vanishing point on the image plane. This vector is of length one and may be described as the coordinates of the intersection of a Gaussian sphere (a sphere of radius 1.0) centered at the optical system origin (the focal point) and the line passing through both the optical system origin and the vanishing point on the image plane. This vector representation of the vanishing point is advantageous because it contains the entire space of the image plane.

In one embodiment of the invention as shown in FIG. 1, a digital image is input to a vanishing point detector 12. The purpose of the vanishing point detector is to identify the locations of the vanishing points of the digital image. As is well known in the art, a vanishing point is the result of the perspective projection of the three dimensional scene onto a two-dimensional image plane. A vanishing point refers to the point in the image plane (a two dimensional projection of the three dimensional scene) where parallel lines in the scene meet. Vanishing points generally only have relevance for images containing a structure with at least two line segments, generally from man-made structures. Several authors have documented methods of automatically locating the vanishing points of an image. For example, S. Barnard, "Interpreting Perspective Images," *Artificial Intelligence*, vol. 21, pp. 435-462, 1983. A preferred automated technique is disclosed in U.S. Pat. No. 6,778,699 Gallagher, entitled "Vanishing Point Detection by Training with Ground Truth Data", which is incorporated herein by reference. In addition, the vanishing point detector may include manually identifying the vanishing points using operator input. The vanishing point detector 12 outputs the locations of all vanishing points identified for the image. Characteristically, the number of vanishing points determined for a single image is not greater than three, although this should not be viewed as a limitation. As described below, the vanishing points determined for the image are output in the form of vanishing point vectors. Assuming that M vanishing points are determined for the digital image, the output of the vanishing point detector may be represented as $v_{Gm}$, where m ranges from 1 to M. Alternatively, it is possible that zero vanishing points may be determined for the digital image. In this event, the present invention cannot draw any conclusions regarding image rotation from the location(s) of vanishing point(s).

Figure 10:
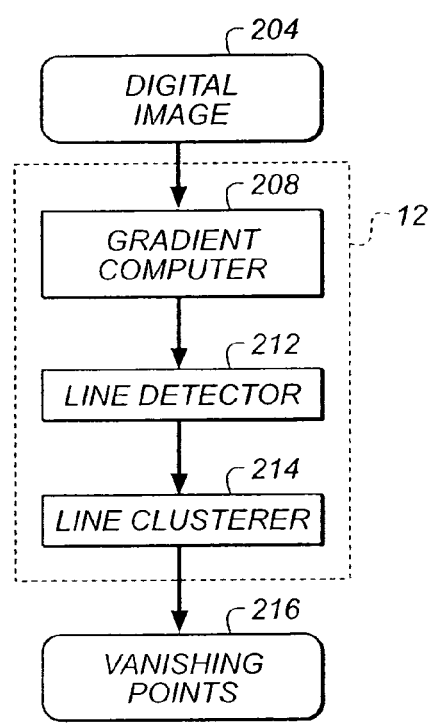
FIG. 10 shows a more detailed view of the vanishing point detector from FIG. 1.

FIG. 10 shows a more detailed view of the vanishing point detector 12. A digital image 204 is passed to the gradient computer 208 for calculating local gradient magnitudes and/or gradient orientations in the image. The digital image 204 can be a frame from a video, which is simply a collection of digital images, often with an accompanying audio signal. Preferably, the gradient computer 108 uses the well-known Sobel operator, a spatial filter, to calculate the gradients. Conceptually, the gradient magnitude is large at image positions at or near a line or edge in an image. The gradient magnitude is small for image regions that are smooth or uniformly textured. The gradient magnitude is calculated by comparing differences among pixel values in a neighborhood of the image. The line detector 212 analyzes the gradient information from the gradient computer 208 and computes lines. An example of a line detector 212 is the well-known Hough Transform described in U.S. Pat. No. 3,069,654 that extracts the parameters for lines from an edge image. A preferred line detector 212 is described in U.S. Pat. No. 6,778,699 by Gallagher; it uses connected component analysis to find connected clusters of pixel positions with large gradient orientations and similar orientations. A line clusterer 214 analyses the detected lines and considers the intersections of pairs of lines for detecting vanishing points 216. A group of lines is selected wherein all lines intersect within a small neighborhood. The intersection of the group of lines is a detected vanishing point. In summary, vanishing points are detected by calculating local image gradients and lines. These vanishing points are then used to determine the rotation of the camera from the level position at the time of image capture.

If M>0, then the vanishing point vectors detected by the vanishing point detector 12 are input to a vanishing point selector 13. The purpose of vanishing point selector 13 is to determine those vanishing points that may be useful for determining the amount of rotation (i.e. the rotation of the camera from the level position at the time of capture) of the digital image by using the information contained in the M vanishing point vectors.

The vanishing point selector 13 determines if any of the M vanishing points associated with the digital image may be used to determine the amount of rotation of the digital image.

Those vanishing points that may be used to determine the format of the image are referred to as "rotation candidate vanishing points."

In the preferred embodiment, a rotation candidate vanishing point is any vanishing point having an associated vanishing point vector $v_G=[x_G, y_G, z_G]$ meeting the either of the following two conditions:

$$|x_G|>T_1 \qquad 1.$$

$$|y_G|>T_1 \qquad 2.$$

Figure 6:
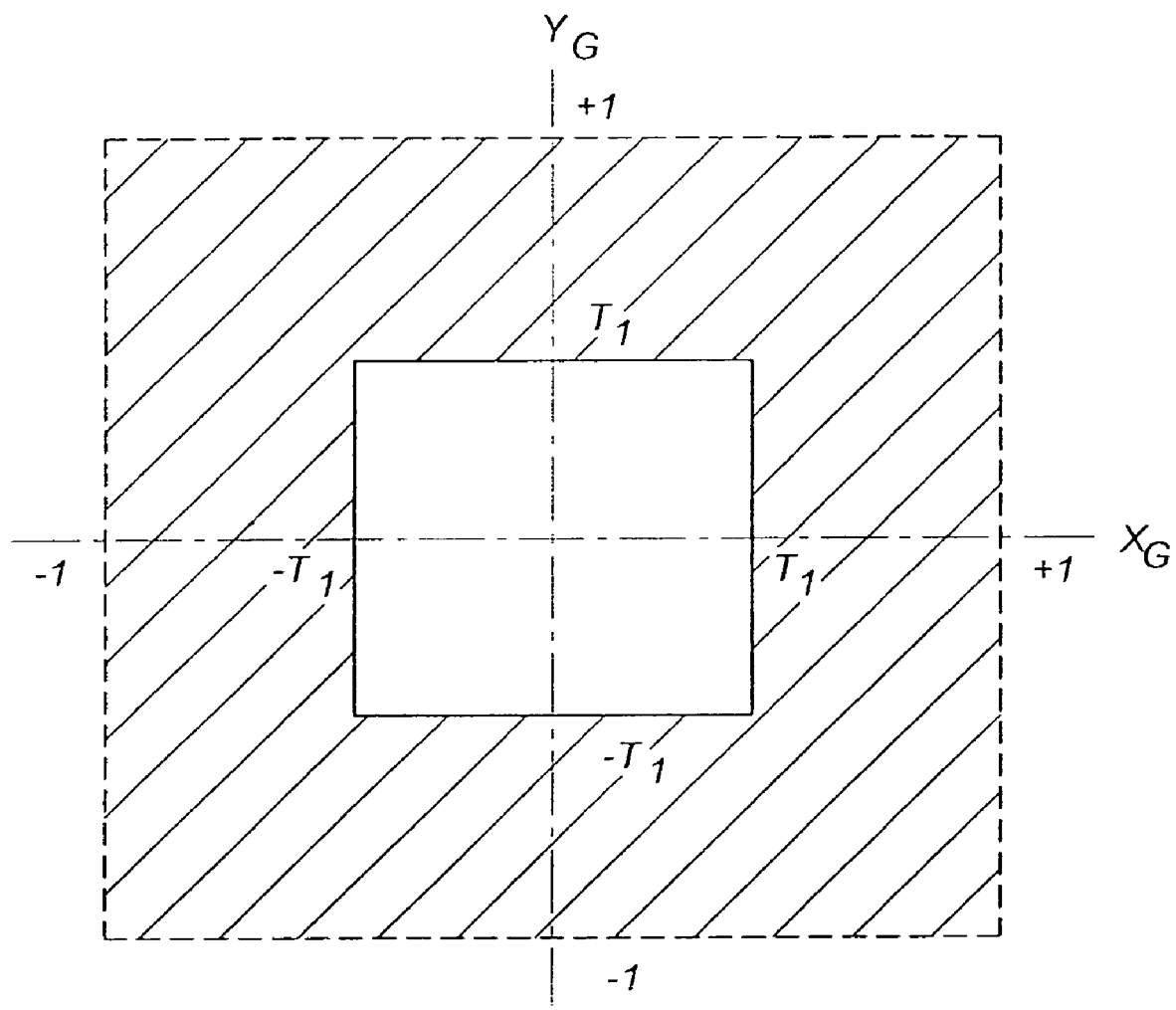
FIG. 6 is a diagram useful in describing the present invention.

Values of $T_1$ between 0.3 and slightly less than 1 are useful in practicing the present invention. In the preferred embodiment, $T_1$ is set at 0.5. The regions in the $x_G$, $y_G$ plane in which such vanishing points lie are illustrated by cross hatching in FIG. 6. The vanishing point selector 13 outputs N (where N is between 0 and M) format candidate vanishing points.

Alternatively, it should be well understood that those skilled in the art can easily modify the above stated rules from classifying a vanishing point vector $v_G$ as a rotation candidate vanishing point. For example, a vanishing point vector $v_G$ may be classified as a rotation candidate vanishing point if the following condition is met:

$$\sqrt{x_G^2+y_G^2}>T_2$$

Values of $T_2$ between 0.3 and slightly less than 1 are useful in practicing the invention.

If an image has zero rotation candidate vanishing points (if N=0), then the present invention does not detect the rotation of the digital image using a feature based on vanishing point location.

If there is at least one rotation candidate vanishing point corresponding to the digital image, then the rotation candidate vanishing point is output from the vanishing point selector 13 and input to a rotation detector 14. Note that other information may also be input to the rotation detector 14 in order to aid the determination process. For instance, the format (an identification of the vertical axis of the image as will be described herein) or orientation (an identification of the top of the image) may also be input to the rotation detector 14 for the purpose of determining the rotation amount. The operation of the rotation detector 14 is to determine the angle β between the vertical axis of the image and the vector pointing from the image origin to the vanishing point corresponding to the vertical lines in the scene. In other words, the angle β corresponds to the amount of rotation of the capture device (for example a camera) about the optical axis.

The angle of rotation for each of the N rotation candidate vanishing points is computed by the rotation detector 14 by first projecting the vanishing point under consideration to the xy-plane. This is accomplished according to the following equation:

$$v_{Gxy} = \frac{[x_G, y_G, 0]}{\sqrt{x_G^2+y_G^2}}$$

The vector $v_{Gxy}$ is a vector which generally points in a direction parallel to the vertical axis of the scene.

Next, the angles γ are determined to be the angle between the vector $v_{Gxy}$ and both the positive and negative vertical axes of the image. The vertical axis of an image is the axis on the image plane parallel to either the x-axis or the y-axis which also passes through the "top" and "bottom" of the image. The vertical axis of the image will be further explained herein below. If the vertical axis of the image is known, then the angles γ are computed by taking the inverse cosine of the dot product of the two vectors, as is well known in the art. For example, if the y-axis is the vertical axis of the image, then the angles γ may be determined as:

$$\gamma=\text{sign}(x_G y_G)\cos^{-1}(v_{Gxy} \cdot [0,1,0])$$

$$\gamma=\text{sign}(x_G y_G)\cos^{-1}(v_{Gxy} \cdot [0,-1,0])$$

where sign($x_G y_G$) represents the sign (−1 or +1) of the product of $x_G$ and $y_G$. For example, when $x_G$ and $y_G$ are either both negative or both positive, the sign($x_G y_G$)=1. Alternatively, when only $x_G$ or $y_G$ is negative then sign($x_G y_G$)=−1.

Figure 9:
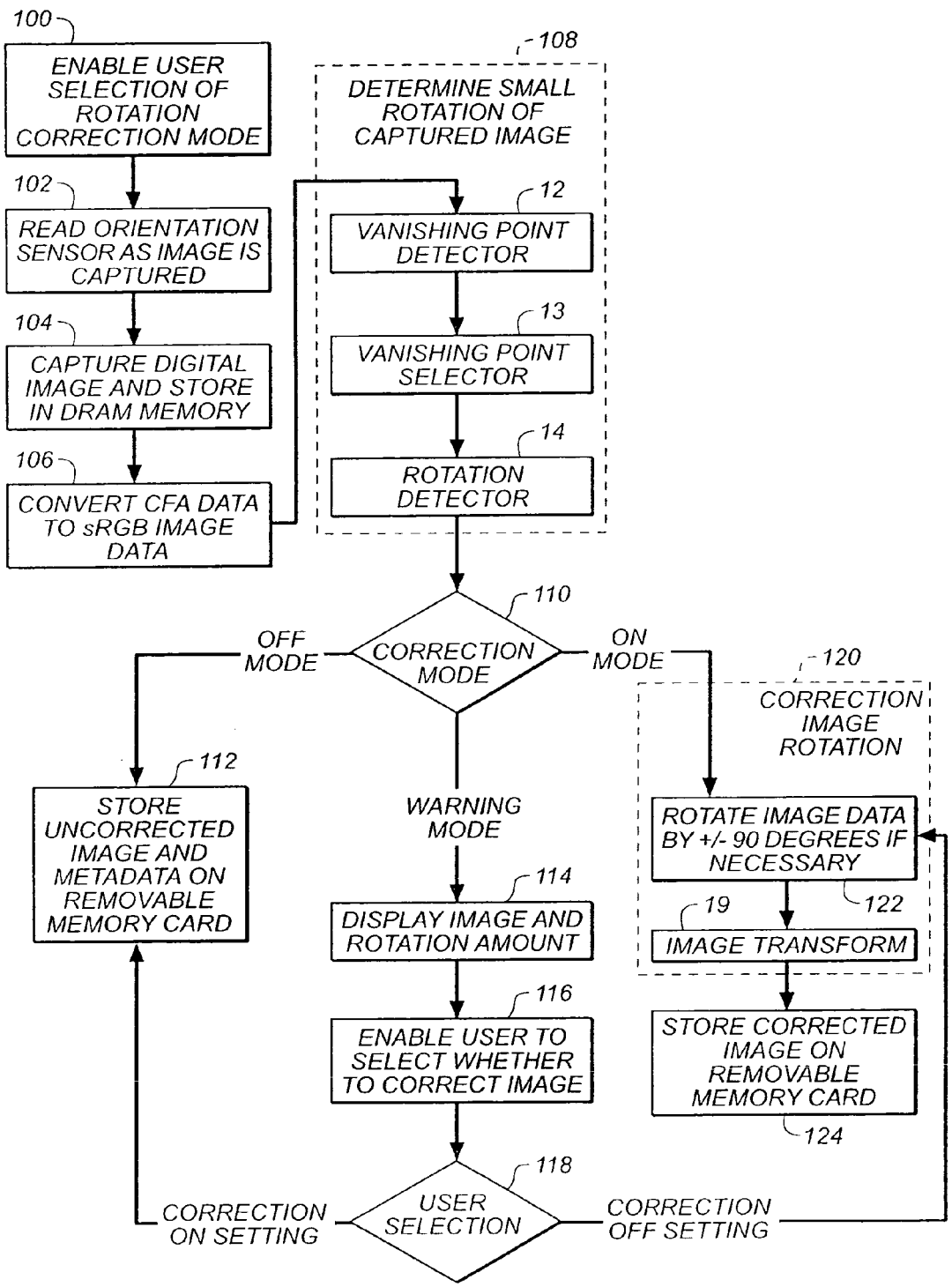
FIG. 9 is a flow diagram showing a method for using a digital camera to determine the amount of rotation present in an image and to correct the rotation.

As shown in FIG. 9, the digital camera 300 provides image capture information 120 to the rotation detector. The image capture information is information other than pixel values related to the image. For example, shutter speed, date and time of image capture, flash firing conditions, identity of photographer, etc. are all image capture information. Furthermore, the camera includes a gravitational orientation sensor as described by Parulski et al. in U.S. Pat. No. 5,900,909. The orientation signal from the gravitational orientation sensor at the time a digital image or video is captured, is image capture information that is passed to a rotation detector 14. The rotation detector 14 uses the orientation signal to identify whether the positive or negative x-axis, or the positive or negative y-axis is the vertical axis of the image. Then, the angles γ are computed as described above.

If the rotation detector 14 does not know the vertical axis of the image, then the angles γ are determined to each image axis (for a total of four angles γ). Thus, for each rotation candidate vanishing point, several angles γ are determined as the angle between the vector $v_{Gxy}$ representing the projection of the vanishing point onto the xy-plane and the image axes. The angle β is determined to be the smallest (in an absolute value sense) of these angles γ. Note that the angle β may be positive or negative in magnitude, indicating the direction of camera rotation. The output of the rotation detector 14 is the angle β. Note that the angle β is expected to be equal to or less than π/4.

FIG. 1 shows that the identification of the vertical axis of the digital image is output from the rotation detector 14 and passed to an image transform 19. According to an alternative embodiment of the invention, this image transform may also receive various other parameters, including the digital image itself. The operation of the image transform 19 may be any number of image transformations that benefit from knowledge of image rotation.

In an example of the use of the rotation information, the angle β of the digital image may be stored as metadata by the image transform 19. Metadata is generally defined as data corresponding to an image apart from actual pixel values.

Additionally, the function of the image transform 19 may account for the rotation of the image by performing an image rotation in the opposite direction. Image rotation is well known by those skilled in the art of image processing. The amount the digital image must be rotated is given by the negative of β.

In another embodiment, the vanishing point vector is interchangeable with the vanishing point location given in Cartesian coordinates.

Figure 3A:
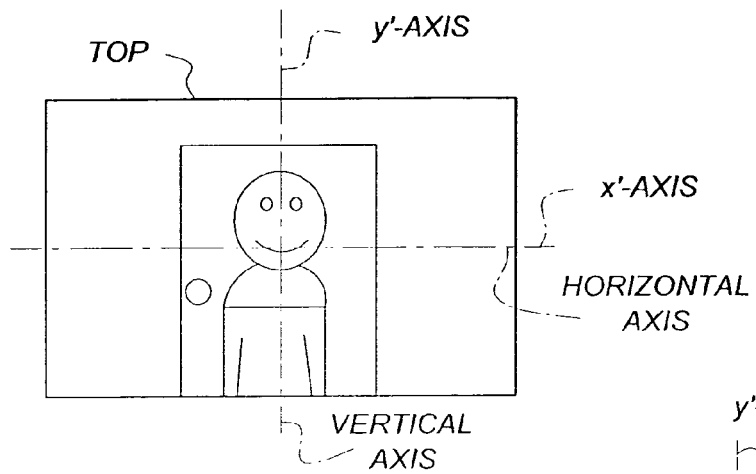
FIGS. 3A-C show several examples of images with different formats and orientations.

FIG. 3 shows several image examples useful for clarifying terms and concepts used herein. FIG. 3A shows an exemplary image of a person. The top of the image is defined as the side of the image that was in the "up" direction from the photographer's perspective at the time of image capture. Identification of the top of an image solves the problem of orientation. In the case of FIG. 3A, the top of the image clearly corresponds to the top of the subject's head. Note that the bottom of an image is always the image side opposite the image top. Also shown in FIG. 3A are axes parallel to the x-axis and the y-axis passing through the image origin. These axes have herein been defined as the x'-axis and the y'-axis, respectively; and shall herein be known collectively as image axes.

Note that the vertical axis of the image is that line that passes through the top and bottom of the image, as well as the image origin and coincident with either the x'-axis or the y'-axis. The vertical axis of the image defines the format of the image, by specifying which two sides are top and bottom. As used herein, the term "format" means the identity of the vertical axis of the image. However, the vertical axis of the image does not specify which of the two sides is the top, thus the orientation of an image may remain unknown even when the format is known. Note in the case of the image in FIG. 3A, the y'-axis is the vertical axis of the image.

Figure 3B:
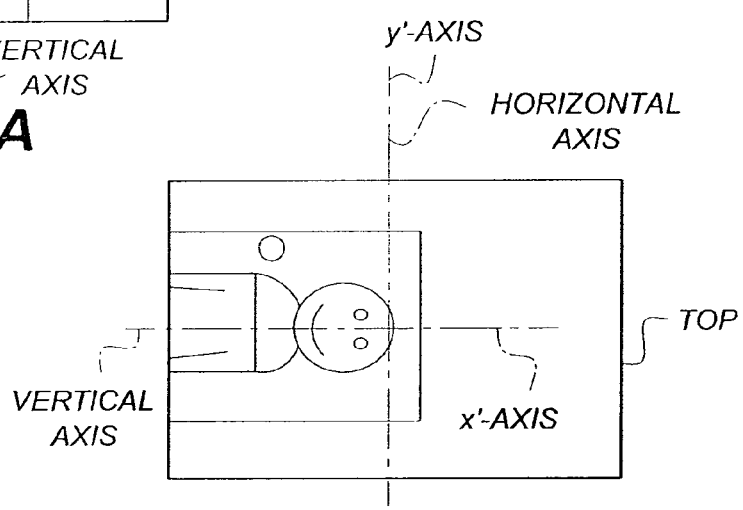
Figure 3C:
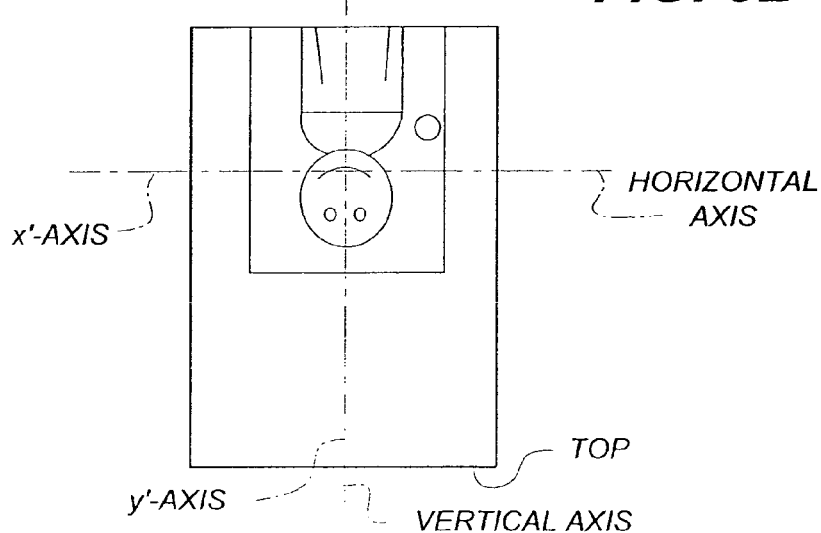

FIG. 3B shows an example where the top of the image is the right image side. In this example, the vertical axis of the image is the x'-axis. Finally, FIG. 3C shows an exemplary image where, like the image in FIG. 3A, the vertical axis of the image is the y'-axis. However, in this example the top of the image lies on the negative y'-axis.

Figure 4A:
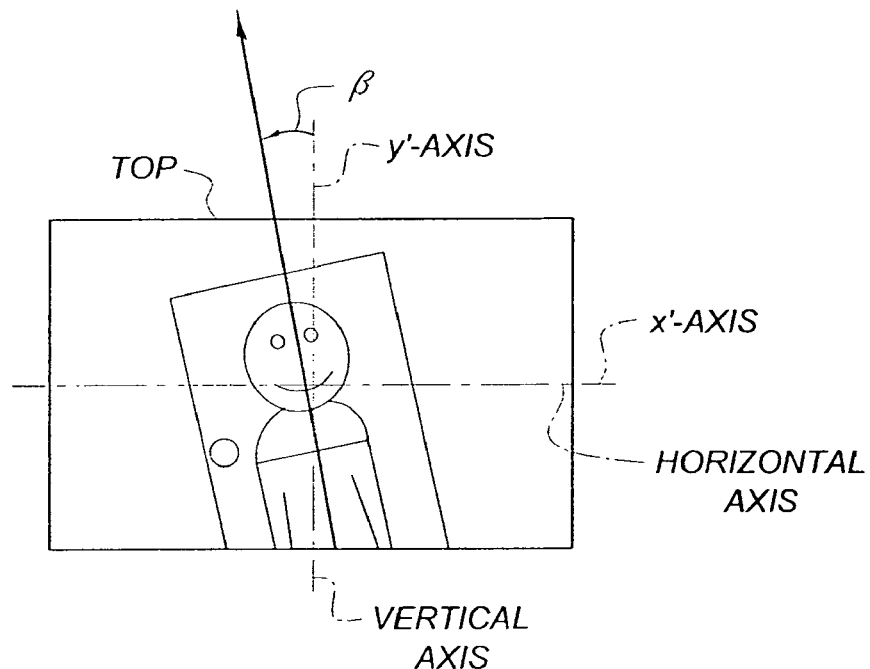
FIGS. 4A-B show the effects on an image as a result of small angle camera rotation.
Figure 4B:
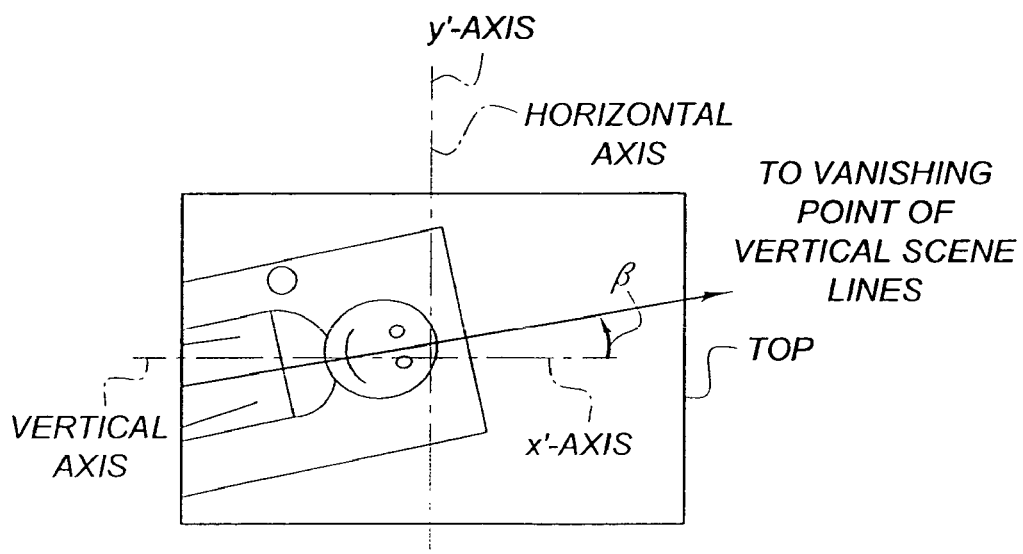

Note that if the camera is not held level at the time of image capture, then the image may appear to be tilted. That is, if the x-axis of the imaging system is not orthogonal to the vertical direction in the scene, then the image will appear to be tilted or rotated. Commonly, the amount of rotation is small since the photographer is making an effort to hold the camera level. For example, FIG. 4A shows an embodiment similar to that of FIG. 3A, except that a simulated amount of camera rotation is also included. Additionally, FIG. 4B discloses an embodiment to that of FIG. 3B with the addition of camera rotation. It is possible to show that the amount of the camera rotation (the angle from the level position) is the same as the angle $\beta$ that the image is rotated. As described herein, the vanishing point locations detected from the image allow for the identification of this angle.

Figure 5A:
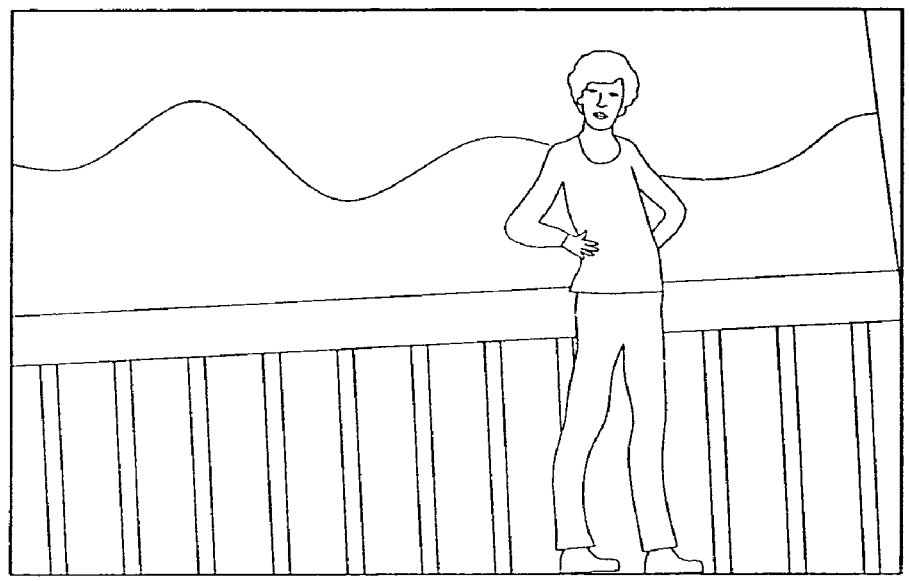
FIGS. 5A-B show an actual image that has been corrected by the method of this invention.
Figure 5B:
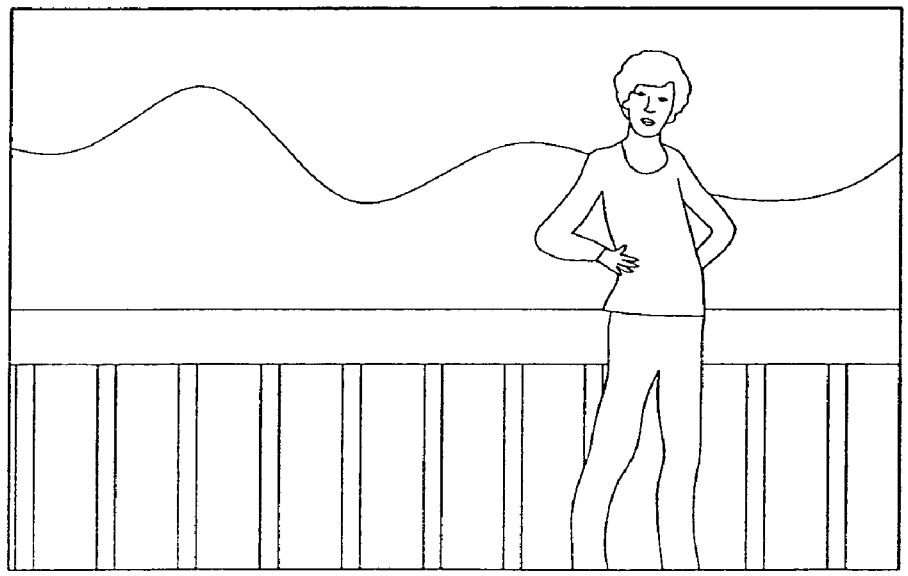

FIG. 5A shows an image that has an apparent amount of camera rotation (the camera was tipped in the clockwise direction at the time of capture.) The method of the present invention was applied to the image and estimated that the amount of rotation of the image in the counter-clockwise direction was 3.4 degrees. FIG. 5B shows the corrected image, generated by rotating FIG. 5A by 3.4 degrees in the clockwise direction. There is a noticeable improvement in the handrail orientation as a result of the processing of the present invention. In the case where the image transform 19 performs a rotation of the digital image, there may be additional logic based upon the value of $\beta$. For instance, if $|\beta|<1$ degree, performing a rotation correction may not produce a result noticeable enough to be worth the computational effort. Additionally, there may be an upper limit on the amount of rotation that the image transform 19 will execute. For example, if $|\beta|=44$ degrees, it may be advantageous that nothing is done to the image, as a modification of this magnitude may produce displeasing results if the value of $\beta$ produced by the algorithm was incorrect. Another aspect of the invention has the image transform 19 performing a rotation by an amount of $-\beta$, the resulting image produced has a vanishing point on the vertical axis of the image (assuming that the value of $\beta$ is correct). In this embodiment, the image transform 19 is a rotating transformation that operates by rotating the image. Such a transformation is a warping of the image, since the geometry of the image output from the image transform 19 has been modified relative to the geometry of the image input to the image transform 19. The location of the rotation candidate vanishing point $v_G$ of the image input to the image transform 19 is an undesirable vanishing point location, because it does not lie on the vertical axis of the image. The vertical axis of the image is considered to be a preferable vanishing point location. However, those skilled in the art will recognize that other preferable vanishing point locations may exist. For instance, infinity (or $z_G=0$ in vanishing point vector notation) may be a preferable vanishing point location. In this case, the digital image may be modified by an image transform 19 designed to warp the image in such a manner that the image resulting from the image transform 19 has a vanishing point now located at infinity. Alternatively, another preferable vanishing point location may be at infinity and also on the vertical axis of the image (in this case, either $x_G$ or $y_G=1$). Clearly, the vanishing point of the image output from the image transform 19 lies on the vertical axis of the image, and is therefore a preferable vanishing point location. Thus, the operation of the image transform 19 is to warp the image in such a fashion that a vanishing point associated with the input image migrates from an undesirable vanishing point location to a desirable vanishing point location in the image output from the image transform 19. Those skilled in the art of image processing will recognize that an image transform 19 may be created (either deterministically or empirically) to warp an image in such a manner as to relocate a vanishing point from an undesirable vanishing point location within the input image to a desirable vanishing point location within the resulting image.

Figure 7:
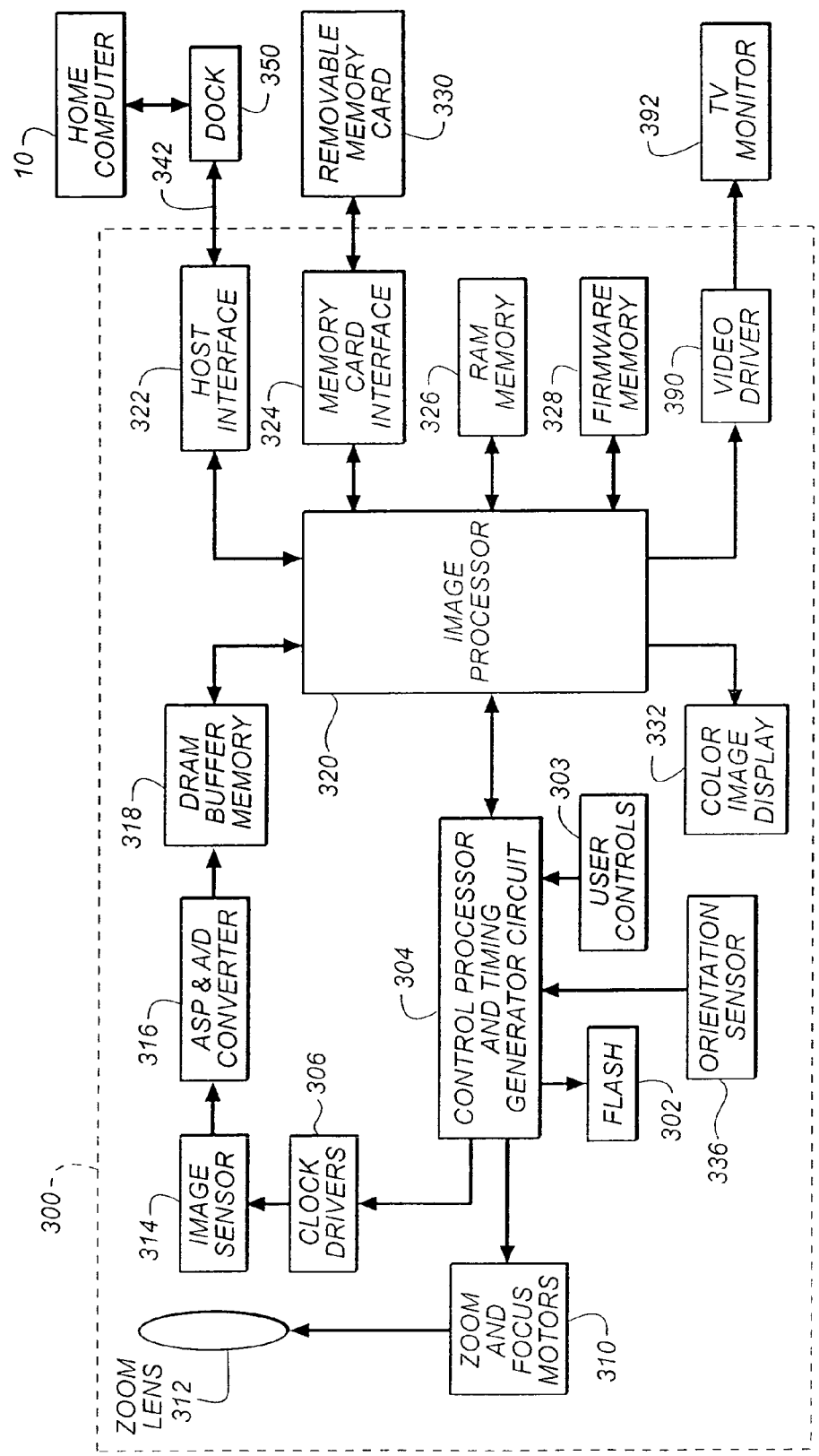
FIG. 7 is a block diagram of a digital camera using the present invention.
Figure 8:
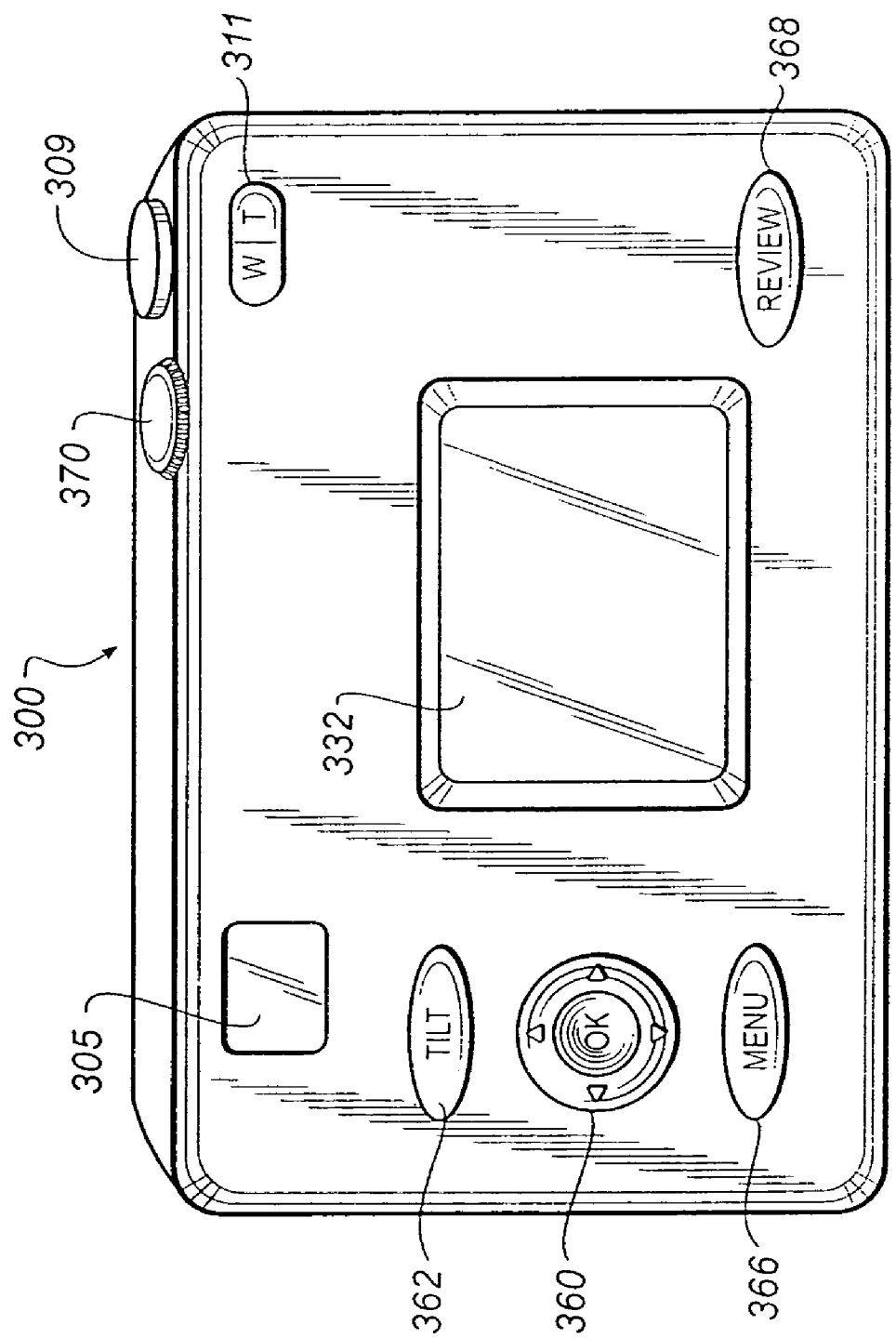
FIG. 8 is a rear view of the digital camera of FIG. 7.

In a further embodiment of the present invention, the rotation of the camera is estimated and corrected by the digital camera that is used to capture the image. FIG. 7 shows a block diagram of a digital camera 300. The back of the digital camera 300, which provides a camera user interface, is shown in FIG. 8. Preferably, the digital camera 300 is a portable battery operated device, small enough to be easily handheld by a user when capturing and reviewing images. The digital camera 300 produces digital images that are stored on the removable memory card 330. The digital camera 300 includes a zoom lens 312 having zoom and focus motor drives 310 and an adjustable aperture and shutter (not shown). Referring to FIG. 8, the user composes the image using an optical viewfinder 305 and a zoom lens control 311, and then depresses shutter button 309 to begin capture of a still image.

Referring again to FIG. 7, zoom lens 312 focuses light from a scene (not shown) on an image sensor 314, for example, a single-chip color CCD image sensor, using the well-known Bayer color filter pattern. The image sensor 314 is controlled by clock drivers 306. The image sensor 314 can have, for example, 3.3 megapixels (2242×1473 pixels), of which the center 3.1 megapixels (2160×1400 pixels) are stored in the final image file after image processing. The zoom and focus motors 310 and the clock drivers 306 are controlled by control signals supplied by a control processor and timing generator circuit 304. The control processor and timing generator 304 receives inputs from an image processor 320, which provides calculations for focus and exposure determination, and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by an image processor 320 controlled by the firmware stored in firmware memory 328, which can be flash EPROM memory.

The digital camera 300 also includes a gravitational orientation sensor 336. The gravitational orientation sensor 336 is used to determine whether the camera is in the normal horizontal "landscape orientation", a first (clockwise 90 degree rotated) vertical "portrait" orientation, or a second (counter-clockwise 90 degree rotated) vertical "portrait" orientation at the time the digital image is captured. The gravitational orientation sensor 336 can be used to automatically rotate the captured image to the proper "upright" orientation, as described in commonly-assigned U.S. Pat. No. 5,900,909, "Electronic still camera having automatic orientation sensing and image correction" to Parulski et al., the disclosure of which is incorporated herein by reference.

The processor 320 performs color interpolation followed by color and tone correction, in order to produce rendered sRGB image data. The processor 320 can also provide various image sizes selected by the user, for example, 3.1 megapixel (MP) "best quality" images, 2.2 MP "better quality" images, or 0.4 MP "VGA quality" images.

The processor 320 also creates a low-resolution version of the captured image, which can be created as described in commonly-assigned U.S. Pat. No. 5,164,831, entitled "Electronic Still Camera Providing Multi-Format Storage Of Full And Reduced Resolution Images" to Kuchta, et al., the disclosure of which is herein incorporated by reference. This low-resolution version is stored in RAM memory 326 and supplied to a color LCD image display 332. After images are captured, they can be quickly reviewed on the color LCD image display 332 by using the thumbnail image data. The digital camera 300 can also include a video output driver 390 for displaying the captured images on a separate TV monitor 392.

The graphical user interface displayed on the color image display 332 (or the TV monitor 392) is controlled by user controls 303. In a preferred embodiment shown in FIG. 8, user controls 303 (see FIG. 7) include a joystick controller 360 that includes 4-way control (up, down, left, right) and a push-button center "OK" switch. User controls 303 further include a "tilt" (small rotation correction) mode button 362, a "menu" button 366 and a "review" button 368. User controls 303 further include the zoom lens control rocker switch 311, the shutter button 309, and the mode dial 370, which sets various camera capture modes, such as auto mode, sports mode, night mode, landscape mode, close-up mode, and video capture mode. In alternative embodiments, many different types of user controls can be used.

The rendered sRGB image data is then optionally corrected for large rotation errors as determined by the gravitational orientation sensor 336 and for any small rotation error determined by analyzing the captured image data, as will be described later in reference to FIG. 9.

The rotation corrected rendered sRGB image data is then JPEG compressed and stored as a JPEG image file on the removable memory card 330. The JPEG file uses the well-known "Exif" image format. This image format includes an Exif application segment that stores particular image metadata, for example, the date and time the picture was captured, the lens f/number and other camera settings, and image captions or comments that can be selected or entered by the camera user. In a preferred embodiment of the present invention, the image processor 320 in the digital camera 300 stores, within each Exif image file, metadata that identifies the amount of rotation that was determined, and whether or not this rotation was corrected in the image data stored in the image file.

The digital image file is provided to a memory card interface 324, which stores the digital image file on the removable memory card 330. Removable memory cards 330 are one type of removable digital image storage medium, and are available in several different physical formats. For example, the removable memory card 330 can include flash memory cards adapted to the well-known PC card, Compact Flash Card, SmartMedia, MemoryStick, MultiMediaCard, Secure Digital Card, or xD memory card formats. Other types of removable digital image storage media, such as magnetic hard drives, USB flashdrives, magnetic tape or optical disks can alternatively be used to store the digital images.

As will be described later with reference to FIG. 9, when the user presses the "review" button 368, the last captured image is displayed on the color image display 332. The user can display other images by pressing the left and right arrows of joystick controller 360. The user can press the "tilt" button 362 to modify whether or not to perform small rotation correction on the last captured image, or on future images.

As shown in FIG. 7, an interface 342 can be used to connect between the host interface 322 in the digital camera 300 and a dock 350, which connects to a home computer 10. The interface 342 may conform to, for example, the well-known USB interface specification. Alternatively, the interface between the digital camera 300 and the home computer 10 can be a wireless interface, such as the well-known Bluetooth™ wireless interface or the well-known 802.11 wireless interface. The interface 342 can be used to download images from removable memory card 330 to the home computer 10.

FIG. 9 is a flow diagram showing a method for using a digital camera to determine the amount of rotation present in an image and to correct the rotation.

In block 100, a tilt control button 362 (which is one of the user controls 303 in FIG. 8) enables the user of the digital camera 300 to set the rotation correction to various modes prior to capturing pictures. In one preferred embodiment, these modes include a first mode which does not perform correction, a second mode which warns the user before performing correction, thus permitting the user to select whether or not correction should be performed on the image, and a third mode which always performs correction without asking the user. The control processor and timing generator circuit 304 switches from one mode to the next each time the user presses the tilt control button 362.

In block 102, the digital camera 300 begins the process of capturing an image of the scene (not shown) when the user depresses the shutter button 309. As the image is taken, the position of the gravitational orientation sensor 336 is read to determine if the digital camera 300 is being held in the normal horizontal "landscape orientation", a first (clockwise 90 degree rotated) vertical "portrait" orientation, or a second (counter-clockwise 90 degree rotated) vertical "portrait" orientation at the time the digital image is captured.

In block 104, the image provided by the image sensor 314 is processed and digitized by ASP and A/D converter 316 and stored in DRAM buffer memory 318.

In block 106, the stored color image data from the image data is converted to sRGB image data by performing color filter array interpolation (de-mosaicing), color correction, tone correction, and image sharpening. This processing, which is performed by the image processor 320 in the digital camera 300, can use the algorithms described in commonly assigned U.S. patent application Ser. No. 09/549,356 "Customizing a digital camera", filed Apr. 14, 2000, the disclosure of which is incorporated herein by reference.

In block 108, the image processor 320 in the digital camera 300 determines the amount of small rotation of the captured image. In a preferred embodiment, this is done using the vanishing point detector 12, vanishing point selector 13, and the rotation detector 14 described earlier in relation to FIG. 1.

In an alternative embodiment, the processing can be simplified. Referring to FIG. 10, the vanishing point detector 12 includes the operations of the gradient computer 208 that computes local gradient magnitudes and orientations throughout the digital image 204, the line detector 212 that detects lines, and the line clusterer 214 that considers groups of lines for finding vanishing points 216. In a simplified embodiment, the gradient computer 208 is used to calculate the small rotation correction angle β. The gradient orientations of pixels having large gradient magnitude (e.g. gradient magnitudes from a Sobel operator larger than $T_0$, where $T_0$ is preferably 75) are considered. The mean value of those gradient orientations that are nearly vertical (e.g. within π/10 radians) is determined as variable α. The correction angle β is the angle between a unit vector α and a unit vector in the vertical direction of the image, as previously described.

Referring again to FIG. 9, in block 110, the image processor 320 determines the rotation correction mode, which was set in block 100.

If the correction mode in block 110 is the "off mode", (e.g. do not perform any correction), in block 112 the uncorrected image is JPEG compressed and formatted as an Exif image file, along with metadata which indicates the rotation angle "β" that was detected in block 14. This enables the rotation to be performed at a later time, if desired. This uncorrected image file is then stored on the removable memory card 330.

If the correction mode in block 110 is the "warning mode" the captured image and the amount of rotation detected is displayed on the color image display 332. In a preferred embodiment, the user can press the tilt button 362 to alternatively select the uncorrected mode or the corrected mode. Upon entering block 114, the corrected image is displayed on the color image display 332 along with text indicating "correction on", and the amount of rotation that will be corrected.

In block 116, if the user then presses the tilt button 362, the uncorrected image is immediately displayed on the color image display 332, so that the user can observe the slight change in rotation angle. A text warning "correction off" is also displayed. If the user presses the tilt button 362 a second time, the corrected image is again displayed along with the "correction on" text. Other exemplary means of displaying status of the correction feature for the present invention include icons and audio signals.

In block 118, when the user presses the "OK" button 360, the user selection is determined. If the user selected "correction on" setting, the uncorrected image is stored as described earlier in reference to block 112.

If the user selected the "correction off" setting in block 118, or if the correction mode in block 110 is the "on mode", the process advances to block 120, where image correction processing is performed prior to storing the image on the removable memory 330.

In block 122, sRGB image data stored in the DRAM buffer memory 318 of the digital camera 300 is rotated by +90 degrees or −90 degrees, if the gravitational orientation sensor indicated that the camera was in a vertical orientation when the image was captured in block 102. This orientation correction can be provided by re-ordering the rows and columns of image data, as described in previously cited U.S. Pat. No. 5,900,909.

In block 19, small rotation correction is performed using the process described earlier in relation to FIG. 1.

In block 124, the corrected image is JPEG compressed and formatted as an Exif image file. The Exif file can include metadata that indicates that the image has been corrected using the correction angle β. This corrected image file is then stored on the removable memory card 330.

In some alternative embodiments, selections along with the values of correction angle β are stored. When enough selections have been accumulated, the additional logic in the image transform 19 can be modified to match the expectations of the user. For example, when the user consistently "accepts" the warped image when the correction angle is less then 15 degrees but "rejects" the warped image otherwise, then the upper limit on the amount of rotation that the image transform 19 will execute is altered to be 15 degrees.

Those skilled in the art will recognize that many variations may be made to the description of the present invention without significantly deviating from the scope of the present invention.

PARTS LIST 2 focal point
3 image plane
4 image origin
12 vanishing point detector
13 vanishing point selector
14 rotation detector
19 image transform
100 operation
102 operation
104 operation
108 operation
110 operation
112 line detector
114 line clusterer
116 operation
118 operation
120 image capture information
122 operation
124 operation
204 digital image
208 gradient computer
212 line detector
214 line clusterer
216 vanishing points
300 digital camera
302 flash
303 user controls
304 control processor and timing generator circuit
305 optical viewfinder
306 clock drivers
309 shutter button
310 zoom and focus motors
311 zoom lens control rocker switch
312 zoom lens
314 image sensor
316 ASP & A/D converter circuit
318 DRAM buffer memory
320 image processor
322 host interface
324 memory card interface
326 RAM memory
328 firmware memory
330 removable memory card
332 color image display
336 gravitational orientation sensor
342 interface cable
350 dock
360 joystick
362 tilt button
366 menu button
368 "review" button
370 mode dial
390 video driver
392 TV monitor

What is claimed is:

1. A method of detecting and correcting a small camera rotation in a digital image captured by a portable hand held digital camera, comprising using a processor to perform the steps of:
   a) capturing a digital image of a scene using the portable hand held digital camera to provide a captured digital image, wherein the portable hand held digital camera is not held level during the capture of the digital image, being unintentionally positioned at a small rotation relative to the scene;
   b) analyzing the captured digital image to detect a set of lines corresponding to horizontal or vertical structures in the scene;
   c) computing at least two parameters representing each individual line in the set of lines;
   d) determining a rotation angle of the captured digital image responsive to intersection points determined between two or more lines from the set of lines, wherein the intersection points are determined responsive to the parameters representations of the two or more lines from the set of lines, and wherein the magnitude of the rotation angle is less than or equal to 45 degrees and corresponds to the unintentional small rotation relative to the scene;
   e) warping the captured digital image based on the rotation angle; and
   f) storing the warped digital image.

2. The method claimed in claim 1, wherein analyzing the captured digital image includes computing gradient information at a number of locations in the captured digital image.

3. The method claimed in claim 1, further comprising the step of using a gravitational orientation sensor for determining vertical axis of the captured digital image.

4. The method claimed in claim 3, wherein step d) above uses the vertical axis to determine the rotation angle.

5. The method claimed in claim 1, wherein the rotation angle and the warped digital image are stored in a memory of the portable hand held digital camera.

6. The method claimed in claim 5, wherein the rotation angle and the warped digital image are both stored in an image file.

7. The method claimed in claim 1, further comprising the step of displaying the warped digital image.

8. The method claimed in claim 7, further comprising the step of employing a user interface to enable a user to select the captured image or the warped digital image for storage.

9. The method claimed in claim 7, further comprising displaying the captured digital image.

10. The method claimed in claim 1, further comprising the step of determining a vanishing point location from the set of lines.

11. The method claimed in claim 10, wherein the rotation angle is computed from the vanishing point location.

12. A method of detecting and correcting a small camera rotation in a digital image captured by a portable hand held digital camera, comprising using a processor to perform the steps of:
   a) capturing a digital image of a scene using the portable hand held digital camera to provide a captured digital image, wherein the portable hand held digital camera is not held level during the capture of the digital image, being unintentionally positioned at a small rotation relative to the scene;
   b) using a gravitational orientation sensor for determining a vertical axis of the captured digital image
   c) analyzing the captured digital image to detect a set of lines corresponding to horizontal or vertical structures in the scene;
   d) computing at least two parameters representing each individual line in the set of lines;
   e) determining a rotation angle of the captured digital image responsive to intersection points determined between two or more lines from the set of lines, wherein the intersection points are determined responsive to the parameters representations of the two or more lines from the set of lines, and wherein the magnitude of the rotation angle is less than or equal to 45 degrees and corresponds to the unintentional small rotation relative to the scene;
   f) warping the captured digital image based on the rotation angle and the vertical axis; and
   g) storing the modified digital image.

13. The method claimed in claim 12 wherein step e) above uses the vertical axis to determine the small rotation angle.

14. The method claimed in claim 12, wherein analyzing the captured digital image includes computing gradient information at a number of locations in the captured digital image.

15. The method claimed in claim 12, wherein analyzing the captured digital image includes detecting a set of lines in the captured digital image.

16. The method claimed in claim 12, wherein analyzing the captured digital image includes detecting a vanishing point location.

17. A method of detecting and correcting a small camera rotation in a digital image captured by a portable hand held digital camera, comprising using a processor to perform the steps of:
   a) capturing a digital image of a scene using the portable hand held digital camera to provide a captured digital image, wherein the portable hand held digital camera is not held level during the capture of the digital image, being unintentionally positioned at a small rotation relative to the scene;
   b) analyzing the captured digital image to detect a set of lines corresponding to horizontal or vertical structures in the scene;
   c) computing at least two parameters representing each individual line in the set of lines;
   d) determining a rotation angle of the captured digital image responsive to intersection points determined between two or more lines from the set of lines, wherein the intersection points are determined responsive to the parameters representations of the two or more lines from the set of lines, and wherein the magnitude of the rotation angle is less than or equal to 45 degrees and corresponds to the unintentional small rotation relative to the scene;
   e) warping the captured digital image based on the rotation angle;
   f) displaying the warped digital image;
   g) employing a user interface to enable a user to select either the captured digital image or the warped digital image for storage; and
   h) storing the selected digital image.

18. The method claimed in claim 17, wherein the user interface enables the user to selectively display either the captured digital image or the modified digital image.

19. The method claimed in claim 17, wherein analyzing the captured digital image includes detecting a vanishing point location.

20. A portable hand held digital camera comprising:
a) an image sensor for capturing an image of a scene;
b) a first memory for storing the captured image;
c) a processor for analyzing the captured image to:
  i) detect a set of lines corresponding to horizontal or vertical structures in the scene;
  ii) compute at least two parameters representing each individual line in the set of lines;
  iii) determine a rotation angle of the captured image using the set of line responsive to intersection points determined between two or more lines from the detected set of lines, wherein the intersection points are determined responsive to the parameters representations of the two or more lines from the set of lines, and wherein the magnitude of the rotation angle is less than or equal to 45 degrees and corresponds to unintentional small rotations introduced into the digital image when the portable hand held digital camera is not held level during the capture of a digital image, the portable hand held digital camera being unintentionally positioned at a small rotation relative to the scene; and;
  iv) provide a warped image based on the rotation angle;
d) a display for displaying the warped image;
e) a user interface for selecting the warped image or the captured image; and
f) a second memory for storing the selected image.

* * * * *